Patented Jan. 2, 1951

2,536,703

UNITED STATES PATENT OFFICE

2,536,703

USE OF ALKALI METAL FERRATE AS A DECOLORIZING AGENT FOR CAUSTIC SOLUTIONS

James M. Schreyer, Lexington, Ky.

No Drawing. Application May 12, 1949,
Serial No. 92,945

4 Claims. (Cl. 23—184)

The nomenclature of the alkali metal ferrate compound is made to conform to the recommended procedure of the "Committee on Nomenclature of the American Chemical Society" as indicated in the Journal of the American Chemical Society, vol. 63, 1941, pp. 889–897.

The present invention relates to the use of the ferrate (VI) ion as a decolorizing agent for caustic solutions and has for its main object a method by which a ferrate can be added in solid or solution form to a colored caustic solution to decolorize the solution. A further object is to provide a method of decolorizing caustic solutions which will be economical and simple of operation for application to the commercial caustic production. A third object is to provide a decolorizing agent which will not introduce into the present operation of caustic production an added operation of removing the products produced by the decolorizing reaction.

Further objects of my invention will become apparent as the specification proceeds.

Caustic solutions prepared by the commonly used electrolytic cells is highly colored. Many oxidizing agents have been investigated for use in decolorizing these solutions but without success because of the addition of undesirable impurities in the final caustic solution. A decolorizing agent for commercial caustic which does not introduce added operations in the present caustic production has not been found before my present invention.

I have discovered that a ferrate (VI) ion in solid form or solution can be added to a highly colored caustic solution prepared in the commonly used electrolytic cells to decolorize the same, the oxidizing action being hastened by gently warming the solution. The operation could be introduced just after the caustic has been taken from the electrolytic cells and before the iron removal process which is carried out by allowing strontium sulfate or magnesium carbonate to settle through the solution. By adding the operation at this point no additional impurities are added to the final caustic solution since the decomposition products of the ferrate (VI) ion is the ferrite (III) ion in this strongly basic solution. I have found that about six (6) pounds of potassium ferrate will decolorize 20,000 gallons of commercial caustic. The quantity of ferrite (III) ion added to the caustic would be negligible. The reagents necessary to prepare a ferrate (VI) ion are chlorine gas, caustic solution and ferric hydroxide; the first two reagents being products of the caustic industry, and the third can be prepared from any iron compound or iron itself which is not an expensive item.

For a specific illustration of my invention, I prepare an alkali ferrate by the method discovered by your applicant, oxidizing ferric hydroxide in strong caustic solution with chlorine gas under controlled conditions. I prefer not to purify the alkali ferrate since the addition of the impurities of alkali chlorides is not objectionable in the caustic production process, since the process of adding the ferrate solution is carried out before the evaporation of the caustic solution to concentrate the caustic by means of which the alkali chloride is removed from the final product. I am aware that the purified ferrate sample could be used for the same purpose. I then add the solution of alkali ferrate, or add the solid alkali ferrate as the case may be, in a proportionate amount depending on the volume of the caustic solution to be decolorized. I then warm the caustic solution if it is not already warm not allowing the temperature to be above 50° C. for fear of losing some of the ferrate by decomposition at this higher temperature. The solution is immediately decolorized and the usual operation employed in the caustic industry may then be carried out.

As an example of my process, I have taken 1000 ml. of blue commercial caustic solution, prepared by an industrial company, and added 0.5 g. of sodium ferrate in basic solution. I then warmed the solution to 45° C. and the caustic solution became colorless.

By titration of two different solutions of colored caustic with 0.1 M sodium ferrate solutions, I found that 5.82# of $Na_2FeO_4$/20,000 gal. of NaOH and 5.90# of $Na_2FeO_4$/20,000 gal. of NaOH respectively were needed to decolorize these solutions. The resulting solutions when subjected to the usual chloride and iron removal process produced a final caustic solution of purity acceptable to industrial standards.

I have discovered that the ferrate (VI) ion in an alkaline medium can be used as a decolorizing agent as described herein and regard this fact as the basis of my invention, and I have hereby for the first time set forth these facts by which the art may use a ferrate (VI) ion in this capacity with certainty and economy.

I am aware that the foregoing example shows the application of my invention by using sodium ferrate to decolorize sodium hydroxide only. I want it understood that this is illustrative only and that I fully contemplate the application of my discovery to other alkali ferrates and alkali solutions, since it is the ferrate (VI) ion which is oxidizing the organic dye in the alkali solution.

I claim:

1. A method of destroying colored impurities in basic solutions comprising adding a small amount of solution of the alkali metal ferrate (VI) compound to a much larger amount of the basic solution containing the colored impurities; all the ferrate (VI) ion being reduced to the ferrite (III) ion rendering the resulting basic solution colorless.

2. A method of destroying colored impurities in basic solutions comprising adding a small amount of solid alkali metal ferrate (VI) compound to a larger amount of the basic solution containing the colored impurities; all the ferrate (VI) compound being reduced to the ferrite (III) compound rendering the resulting basic solution colorless.

3. A method of destroying colored impurities in alkali solutions comprising adding a small amount of solution of the alkali metal ferrate (VI) compound to a larger amount of the alkali solution containing the colored impurities; all the ferrate (VI) ion being reduced to the ferrite (III) ion rendering the resulting alkali solution colorless.

4. A method of destroying colored impurities in alkali solution comprising adding a small amount of solid alkali metal ferrate (VI) compound to a larger amount of the alkali solution containing the colored impurities; all the ferrate (VI) compound being reduced to the ferrite (III) compound rendering the resulting alkali solution colorless.

JAMES M. SCHREYER.

REFERENCES CITED

The following references are of record in the file of this patent:

UNITED STATES PATENTS

| Number | Name | Date |
| --- | --- | --- |
| 1,919,308 | Stauf | July 25, 1933 |
| 1,944,630 | Bender | Jan. 23, 1934 |
| 1,998,471 | Van der Cook | Apr. 23, 1935 |
| 2,207,566 | Waldeck | July 9, 1940 |
| 2,282,294 | Coey | May 5, 1942 |

OTHER REFERENCES

Mellor's "Inorganic and Theoretical Chemistry," vol. 13, 1934 ed., page 933, Longmans, Green & Co., N. Y., publishers.

Mellor's "Modern Inorganic Chemistry," single vol. ed., 1935, page 605, Longmans, Green & Co., N. Y., publishers.

Ephraim's "Inorganic Chemistry," by Thorne and Roberts, 1943 ed., page 476, Nordeman Publishing Co., N. Y., publishers.